United States Patent
Lee et al.

(10) Patent No.: US 10,436,962 B2
(45) Date of Patent: *Oct. 8, 2019

(54) PREPARING METHOD FOR POLARIZER HAVING LOCALLY DEPOLARIZED AREA, POLARIZER AND POLARIZING PLATE MANUFACTURED BY USING THE SAME

(71) Applicant: LG CHEM, LTD., Seoul (KR)

(72) Inventors: Byung-Sun Lee, Daejeon (KR); Sung-Hyun Nam, Daejeon (KR); Kyun-Il Rah, Daejeon (KR)

(73) Assignee: LG CHEM, LTD., Seoul (KR)

( * ) Notice: Subject to any disclaimer, the term of this patent is extended or adjusted under 35 U.S.C. 154(b) by 108 days.

This patent is subject to a terminal disclaimer.

(21) Appl. No.: 14/911,240

(22) PCT Filed: Sep. 26, 2014

(86) PCT No.: PCT/KR2014/009022
§ 371 (c)(1),
(2) Date: Feb. 9, 2016

(87) PCT Pub. No.: WO2015/108261
PCT Pub. Date: Jul. 23, 2015

(65) Prior Publication Data
US 2016/0195653 A1 Jul. 7, 2016

(30) Foreign Application Priority Data

Jan. 17, 2014 (KR) .................. 10-2014-0006269
Sep. 23, 2014 (KR) .................. 10-2014-0126248

(51) Int. Cl.
*G02B 5/30* (2006.01)
*G02B 1/12* (2006.01)
*G02B 1/14* (2015.01)

(52) U.S. Cl.
CPC .............. *G02B 5/305* (2013.01); *G02B 1/12* (2013.01); *G02B 1/14* (2015.01)

(58) Field of Classification Search
CPC ........ G02B 5/30; G02B 5/3025; G02B 5/3033; G02B 5/3041; G02B 5/305; G02B 5/3066;
(Continued)

(56) References Cited

U.S. PATENT DOCUMENTS

| 4,181,756 A | 1/1980 | Fergason |
| 2010/0002171 A1 | 1/2010 | Yoshimi |

(Continued)

FOREIGN PATENT DOCUMENTS

| JP | 5862381 U | 4/1983 |
| JP | 58-085405 A | 5/1983 |

(Continued)

OTHER PUBLICATIONS

Solvay Chemicals Liquid Caustic Soda (NaOH in water, up to 50%), p. 5 (http://www.matweb.com/search/datasheet.aspx?matguid=bd647fe6a2fd45a1a5df8b79d8d6b74d&ckck=1, accessed Jun. 15, 2018).*

(Continued)

*Primary Examiner* — Derek S. Chapel
*Assistant Examiner* — Adam W Booher
(74) *Attorney, Agent, or Firm* — Dentons US LLP

(57) ABSTRACT

The present invention relates to a method of manufacturing a polarizer, including: preparing a polyvinyl alcohol-based polarizer dyed with one or more of iodine and dichromatic dyes; and forming a depolarization region having simple substance transmittance of 80% or more in a wavelength band of 400 nm to 800 nm by bringing a decoloring solution including 1 wt % to 30 wt % of a decolorant into local contact with some regions of the polarizer, and a polarizer manufactured using the same.

9 Claims, 4 Drawing Sheets

(58) Field of Classification Search
CPC ...... G02B 5/3083; G02B 5/1809; G02B 1/08;
G02B 1/10; G02B 1/12; G02B 1/14;
G02B 27/283; G02B 27/286; G02F
1/133528; G02F 1/13362; G02F
2001/133531; G02F 2001/133528; B29D
11/00644; B29D 11/00865; B29D
11/00894; B29D 11/00903
See application file for complete search history.

(56) References Cited

U.S. PATENT DOCUMENTS

| | | | |
|---|---|---|---|
| 2012/0052197 A1 | 3/2012 | Sawada et al. | |
| 2012/0105400 A1* | 5/2012 | Mathew | H04N 5/2251 345/207 |
| 2012/0106063 A1 | 5/2012 | Mathew et al. | |
| 2013/0329289 A1* | 12/2013 | Haida | G02B 5/3083 359/483.01 |
| 2014/0036175 A1* | 2/2014 | Morishima | G02B 5/3016 349/15 |
| 2015/0109597 A1* | 4/2015 | Schmitt | G02B 5/3025 355/71 |
| 2015/0153495 A1 | 6/2015 | Matsuda et al. | |
| 2016/0313480 A1* | 10/2016 | Lee | B32B 27/30 |
| 2017/0131448 A1* | 5/2017 | Lee | G02B 5/305 |

FOREIGN PATENT DOCUMENTS

| | | |
|---|---|---|
| JP | 58-168020 A | 10/1983 |
| JP | 60-000427 A | 1/1985 |
| JP | 60036563 B2 | 8/1985 |
| JP | 2008-090216 A | 4/2008 |
| JP | 2011-2816 A | 1/2011 |
| JP | 2013-167835 A | 8/2013 |
| KR | 10-2006-0084168 A | 7/2006 |
| KR | 10-2010-0087837 A | 8/2010 |
| KR | 10-2010-0125558 A | 12/2010 |
| KR | 10-2010-0125560 A | 12/2010 |
| KR | 1020120046035 A | 5/2012 |
| TW | 434148 B | 5/2001 |
| TW | 201339660 A | 10/2013 |
| WO | 2012058525 A1 | 5/2012 |

OTHER PUBLICATIONS

Morita et al., JP 58-168020, English Language Machine Translation, Created Jun. 15, 2018.*

The Chemical Society of Japan, Handbook of Chemistry: Pure Chemistry II (Rev. 4th Edition) p. II-42, Sep. 30, 1983.

* cited by examiner

[Figure 1]
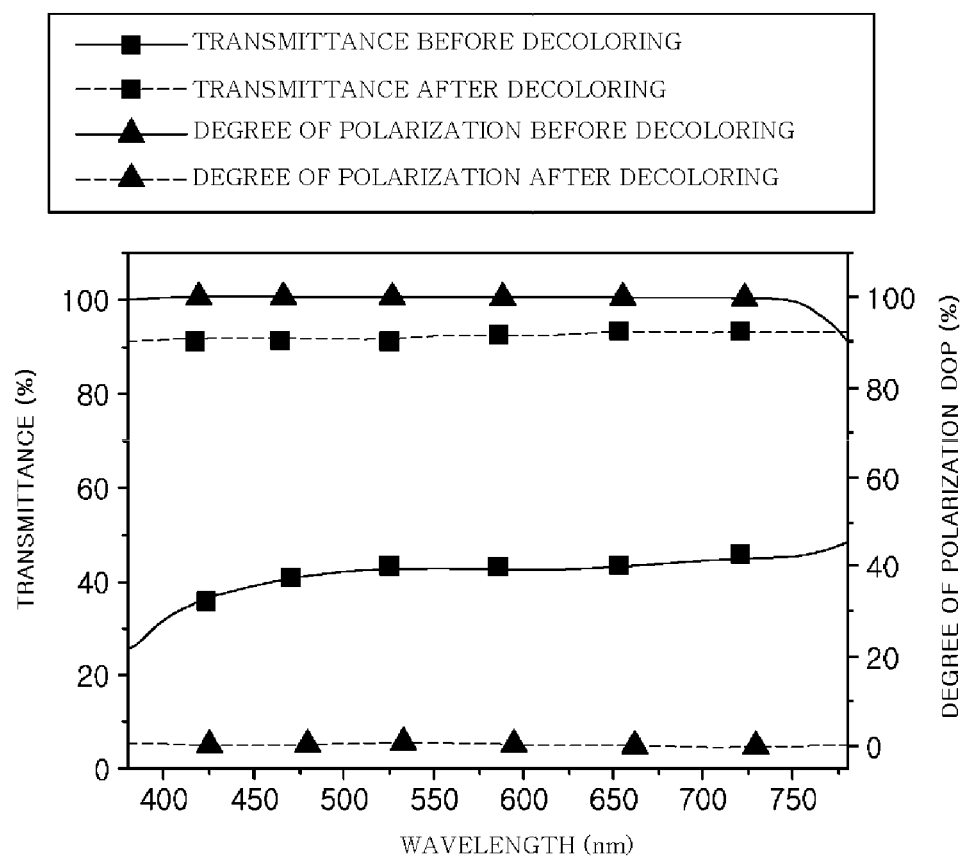

[Figure 2]
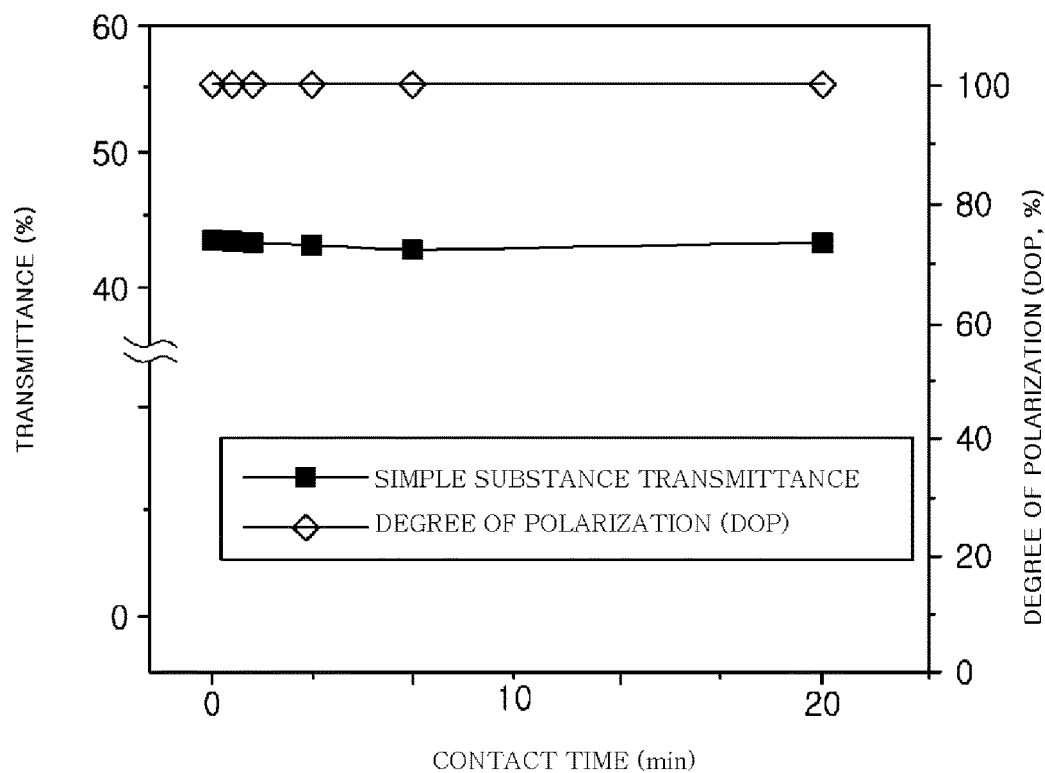

[Figure 3]
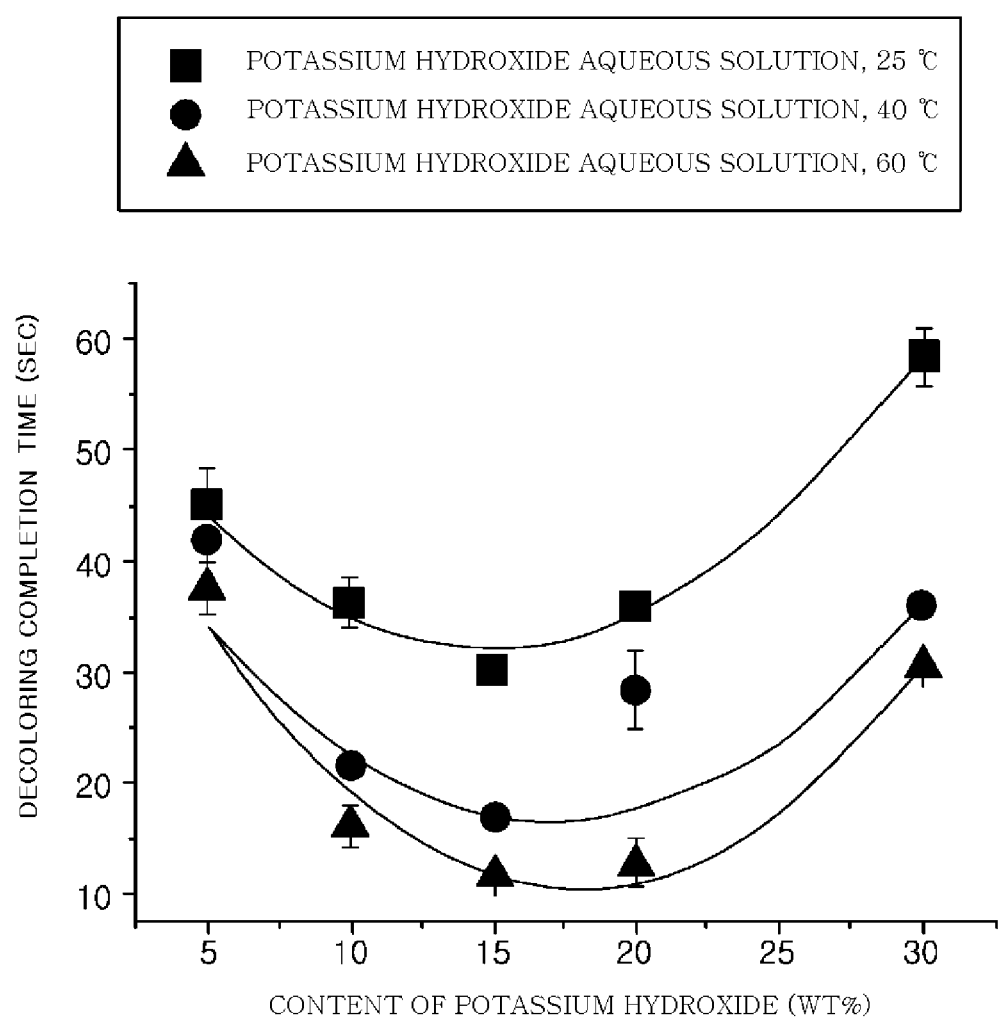

[Figure 4]
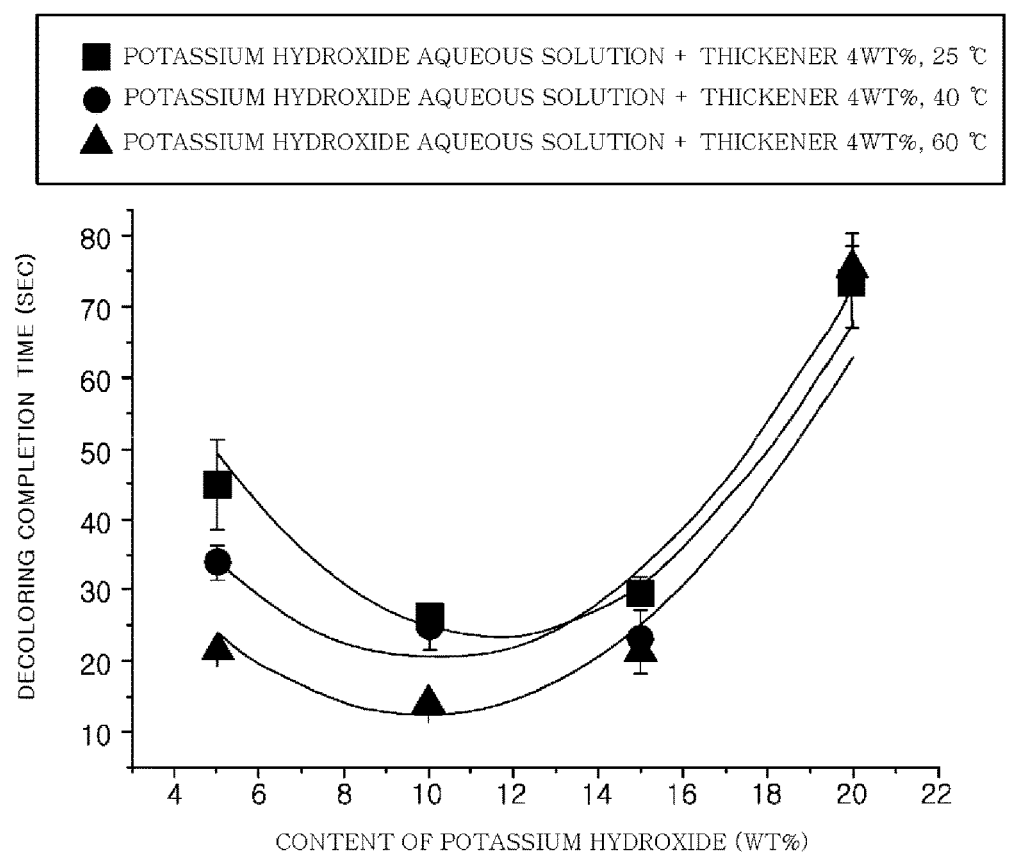

PREPARING METHOD FOR POLARIZER HAVING LOCALLY DEPOLARIZED AREA, POLARIZER AND POLARIZING PLATE MANUFACTURED BY USING THE SAME

This application is a National Stage Application of International Application No. PCT/KR2014/009022, filed on Sep. 26, 2014, which claims the benefit of Korean Patent Application No. 10-2014-0006269, filed on Jan. 17, 2014 and Korean Patent Application No. 10-2014-0126248, filed on Sep. 23, 2014, all of which are hereby incorporated by reference in their entirety for all purposes as if fully set forth herein.

TECHNICAL FIELD

The present invention relates to a method of manufacturing a polarizer, and a polarizer and a polarizing plate manufactured using the same, and more particularly, to a polarizing plate locally having a depolarization region to be suitable for installation of parts such as camera modules and color formation, and a method of manufacturing the same.

BACKGROUND ART

A polarizing plate is applied to various image display devices such as a liquid crystal display and an organic light emitting device. The polarizing plate mainly used in recent years is used in a form where a protection film is laminated on one surface or both surfaces of a PVA polarizer oriented and manufactured by a method of dyeing iodine and/or dichromatic dyes on a polyvinyl alcohol (hereinafter, PVA)-based film, cross-linking the iodine and/or dichromatic dyes by using a boric acid and the like, and then stretching.

Meanwhile, there is a current trend toward increasing sliminess of the image display device, and in order to implement a large screen, the image display device has been developed toward a trend where thicknesses of a bezel portion and an edge where the screen is not displayed are minimized. Further, in order to implement various functions, parts such as cameras tend to be equipped in a display device, and in consideration of a design factor, efforts of providing various colors to a product logo or edge region or decoloring the product logo or edge region have been made.

However, in the case of an existing polarizing plate, since an entire region of the polarizing plate is dyed with the iodine and/or dichromatic dyes, the polarizing plate has a dark black color, and as a result, there are problems in that it is difficult to provide various colors to the image display device, and particularly, in the case where the polarizing plate is positioned on the parts such as the cameras, 50% or more of the intensity of radiation is absorbed by the polarizing plate to reduce visibility of a camera lens.

In order to solve the problems, a method of physically removing a portion of the polarizing plate, which covers the camera lens, by piercing a hole (boring) in the portion of the polarizing plate by a methods such as punching and cutting has been commercialized.

However, the aforementioned physical method degrades an appearance of the image display device, and the polarizing plate may be damaged and a step may be formed at a boundary portion due to characteristics of a process of piercing the hole. Meanwhile, in order to prevent damage such as tearing of the polarizing plate, a bored portion of the polarizing plate should be formed in a region that is sufficiently far away from a corner, and as a result, there is a problem in that in the case when the polarizing plate is applied, the bezel portion of the image display device is relatively widened to deviate from a current narrow bezel design trend of the image display device. Further, there is a problem in that as described above, in the case where a camera module is equipped in the bored portion of the polarizing plate, since the camera lens is exposed to the outside, contamination and damage of the camera lens easily occur when the camera lens is used over a long period of time.

Accordingly, there is a demand for developing a novel process for local depolarization or polarization removal of the polarizing plate corresponding to an appropriate size to overcome the aforementioned problems and to be suitable for installation of the parts such as the camera module in the image display device.

DISCLOSURE

Technical Problem

The present invention has been made in an effort to provide a polarizer where polarization of some regions of a polarizing plate is removed, and a method of manufacturing the same, in which a hole is not physically pierced like the related art, an appearance is not marred, and polarization can be removed by only a simple process.

Technical Solution

An exemplary embodiment of the present invention provides a method of manufacturing a polarizer, including: preparing a polyvinyl alcohol-based polarizer dyed with one or more of iodine and dichromatic dyes; and forming a depolarization region having simple substance transmittance of 80% or more in a wavelength band of 400 nm to 800 nm by bringing a decoloring solution including 1 wt % to 30 wt % of a decolorant into local contact with some regions of the polarizer.

In this case, it is preferable that the decolorant include one or more selected from the group consisting of sodium hydroxide (NaOH), sodium hydrosulfide (NaSH), sodium azide (NaN$_3$), potassium hydroxide (KOH), potassium hydrosulfide (KSH), and potassium thiosulfate (KS$_2$O$_3$).

It is preferable that a pH of the decoloring solution be 11 to 14 and a viscosity of the decoloring solution be 1 cP to 55 cP.

Meanwhile, it is preferable that the decoloring solution further include a thickener, and it is preferable that the thickener include one or more selected from the group consisting of a polyvinyl alcohol-based resin, a polyvinyl acetoacetate-based resin, an acetoacetyl group-denatured polyvinyl alcohol-based resin, butenediolvinyl alcohols, a polyethylene glycol-based resin, and a polyacrylamide-based resin.

In this case, it is preferable that the method further include washing using alcohol after the forming of the depolarization region.

Meanwhile, it is preferable that a contact time (y) of the decoloring solution satisfy the following Equation 1 with respect to a content (x) of the decolorant.

$$y = ax^2 + bx + c \qquad \text{[Equation 1]}$$

In this case, x is 1 to 30, a is 0.1 to 0.7, b is −1 to −20, c is 20 to 120, and −b/2a is 1 to 20.

Another exemplary embodiment of the present invention provides a polyvinyl alcohol-based polarizer dyed with one or more of iodine and dichromatic dyes manufactured by the aforementioned manufacturing method, locally having a depolarization region having simple substance transmittance of 80% or more in a wavelength band of 400 nm to 800 nm and a step formed between the depolarization region and a region other than the depolarization region which is 0 μm to 10 μm.

In this case, it is preferable that in the depolarization region of the polarizer, the degree of polarization be 20% or less, and in the region other than the depolarization region, simple substance transmittance be 40% to 45% and the degree of polarization be 99% or more.

Yet another exemplary embodiment of the present invention provides a polarizing plate manufactured by laminating a polarizer protection film on at least one surface of the polarizer.

Advantageous Effects

In the present invention, a decoloring solution comes into contact with some regions of a polyvinyl alcohol-based polarizer to minimize generation of a step by depolarizing the corresponding region and form a depolarization region that is almost transparent without causing damage such as a hole or tearing. In the case where the polarizer of the present invention manufactured by the aforementioned method is used, even though a polarizing plate is equipped on parts such as cameras, a problem caused by a reduction in luminance does not occur.

Further, in the manufacturing method of the present invention, it is possible to form the depolarization region having a minute size at a desired position by adjusting viscosity of the decoloring solution, and thus it is possible to usefully apply the manufacturing method to a narrow bezel design.

DESCRIPTION OF DRAWINGS

FIG. 1 is a graph illustrating values of simple substance transmittance (Ts) and the degree of polarization (DOP) in a visible-ray region when 10 wt % of a potassium hydroxide (KOH) aqueous solution comes into contact with a polarizer according to Example 2.

FIG. 2 is a graph illustrating values of simple substance transmittance (Ts) and the degree of polarization (DOP) in a visible-ray region when 0.1 wt % of a potassium hydroxide (KOH) aqueous solution comes into contact with a polarizer according to Comparative Example 1.

FIG. 3 is a graph illustrating a correlation between a content of potassium hydroxide (KOH) of an aqueous solution and a decoloring completion time under each temperature condition in the case where a depolarization region is formed by using a potassium hydroxide (KOH) aqueous solution.

FIG. 4 is a graph illustrating a correlation between the content of potassium hydroxide (KOH) of the solution and the decoloring completion time under each temperature condition in the case where the depolarization region is formed by using a solution where a thickener (butenediolvinyl alcohol-based resin, 4 wt %) is included in the potassium hydroxide aqueous solution.

MODE FOR INVENTION

Hereinafter, preferred exemplary embodiments of the present invention will be described. Many modifications and variations of the present invention are possible in light of the aspects, and the present invention has been described in an illustrative manner, the exemplary embodiments of the present invention may be modified into various other forms and it is to be understood that the terminology used is intended to be in the nature of description rather than of limitation, and the scope of the present invention is not limited to exemplary embodiments as will be described below. The exemplary embodiments of the present invention are provided so that those skilled in the art may more completely understand the present invention.

The present inventors found that a polarizer locally having a depolarization region having simple substance transmittance of 80% or more can be manufactured even though a physical method such as punching is not applied by bringing a decoloring solution into selective contact with some regions of a polyvinyl alcohol-based polarizer dyed with iodine and/or dichromatic dyes, thereby accomplishing the present invention.

A method of manufacturing a polarizer according to the present invention includes ① preparing the polyvinyl alcohol-based polarizer dyed with one or more of iodine and dichromatic dyes, and ② forming a depolarization region having simple substance transmittance of 80% or more in a wavelength band of 400 nm to 800 nm by bringing a decoloring solution including 1 wt % to 30 wt % of a decolorant into local contact with some regions of the polarizer.

According to research of the present inventors, like the present invention, in the case where a step of bringing the decoloring solution into local contact with some regions of the polarizer is performed, there are advantageous effects in that as compared to an existing physical removal method such as punching and cutting, problems such as damage to the polarizer and a polarizing plate and contamination of a camera lens can be overcome, it is easy to control the depolarization region, and polarization is removed by only a simple process.

In this case, in the present invention, the depolarization region of the polarizer refers, as will be described below, a region formed through a process of bringing the decoloring solution into selective contact with some regions of the polyvinyl alcohol-based polarizer dyed with the iodine and/or dichromatic dyes. Meanwhile, a region other than the depolarization region means a residual region other than the depolarization region in the polarizer, which has optical properties of the present polarizer as it is.

In this case, simple substance transmittance of the depolarization region formed by the manufacturing method is 80% or more and more preferably 90% or 92% or more in a wavelength band of about 400 nm to 800 nm and preferably about 450 nm to 750 nm, which is a visible-ray region. Further, the degree of polarization of the depolarization region is 20% or less and more preferably 5% or less. As simple substance transmittance of the depolarization region is increased and the degree of polarization is decreased, visibility is improved, and thus performance and image quality of the camera lens to be positioned in the aforementioned region may be further improved, and in the case of color formation, visibility is excellent.

Further, simple substance transmittance of the region other than the depolarization region of the polarizer is preferably 40% to 45% and more preferably 42% to 45%. Moreover, the degree of polarization of the region other than the depolarization region of the polarizer is preferably 99% or more. This is because the residual region other than the depolarization region should exhibit excellent optical properties like the aforementioned range by performing an original polarizer function.

To be more specific, reviewing the manufacturing method of the present invention, first, ① a step of preparing the polyvinyl alcohol-based polarizer dyed with one or more of the iodine and dichromatic dyes may be performed through a dyeing step of dyeing a polyvinyl alcohol-based polymer film with the iodine and/or dichromatic dyes, a cross-linking step of cross-linking the polyvinyl alcohol-based film and the dye, and a stretching step of stretching the polyvinyl alcohol-based film.

First, the dyeing step is a step for dyeing the iodine and/or dichromatic dyes having a dichromatic property on the polyvinyl alcohol-based film, in which the iodine and/or dichromatic dyes may absorb light that vibrates in a stretching direction of the polarizer and allow light that vibrates in a vertical direction to pass, thus obtaining polarization having a predetermined vibration direction. In this case, generally, dyeing may be performed by impregnating the polyvinyl alcohol-based film in a treatment bath including a solution containing a dichromatic material such as an iodine solution.

In this case, as a solvent used in the solution of the dyeing step, water is generally used, but an organic solvent having compatibility to water may be added in an appropriate amount. Meanwhile, the dichromatic material such as iodine may be used in an amount of 0.06 parts by weight to 0.25 parts by weight based on 100 parts by weight of the solvent. The reason is that in the case where the content of the dichromatic material such as iodine is in the aforementioned range, transmittance of the polarizer manufactured after stretching can satisfy the range of 40.0% to 47.0%.

Meanwhile, in the case where iodine is used as the dichromatic material, in order to improve dyeing efficiency, it is preferable that a supplement agent such as an iodide compound be further contained, and the supplement agent may be used at a ratio of 0.3 parts by weight to 2.5 parts by weight based on 100 parts by weight of the solvent. In this case, the supplement agent such as the iodide compound is added in order to increase solubility of iodine to water because solubility of iodine to water is low. Meanwhile, it is preferable that a mixing ratio of iodine and the iodide compound be about 1:5 to 1:10.

In this case, specific examples of the iodide compound that may be added in the present invention may include potassium iodide, lithium iodide, sodium iodide, zinc iodide, aluminum iodide, lead iodide, copper iodide, barium iodide, calcium iodide, tin iodide, titanium iodide, a mixture thereof, or the like, but are not limited thereto.

Meanwhile, a temperature of the treatment bath may be maintained at about 25° C. to 40° C., because at the low temperature of less than 25° C., dyeing efficiency may be reduced, and at the excessively high temperature of more than 40° C., much sublimation of iodine occurs, and thus a use amount of iodine may be increased. Further, an immersion time of the polyvinyl alcohol-based film in the treatment bath may be about 30 seconds to 120 seconds, because in the case where the immersion time is less than 30 seconds, dyeing may not be uniformly performed on the polyvinyl alcohol-based film, and in the case where the immersion time is more than 120 seconds, dyeing is saturated, and thus immersion is not required any longer.

Meanwhile, as the cross-linking step, a deposition method performed by depositing the polyvinyl alcohol-based film in a boric acid aqueous solution and the like is generally used, but the cross-linking step may be performed by a coating method or a spray method spraying a solution on a film.

In this case, as an example of the cross-linking step, the deposition method is performed by, if the iodine and/or dichromatic dyes are dyed on the polyvinyl alcohol-based film by the dyeing step, adsorbing the iodine and/or dichromatic dyes on a polymer matrix of the polyvinyl alcohol-based film by using a cross-linking agent, and immersing the polyvinyl alcohol-based film in a cross-linking bath where a solution containing the cross-linking agent is present. The reason is that if the iodine and/or dichromatic dyes are not well adsorbed on the polymer matrix, the degree of polarization is reduced, and thus the polarizer and the polarizing plate cannot properly perform a role thereof.

In this case, as a solvent used in the solution of the cross-linking bath, water is generally used, but an organic solvent having compatibility to water may be added in an appropriate amount, and the cross-linking agent may be added in an amount of 0.5 parts by weight to 5.0 parts by weight based on 100 parts by weight of the solvent. In this case, in the case where the cross-linking agent is contained in the amount of less than 0.5 parts by weight, cross-linking is insufficient in the polyvinyl alcohol-based film, and thus strength of the polyvinyl alcohol-based film in water may be reduced, and in the case where the amount is more than 5.0 parts by weight, excessive cross-linking is formed, and thus a stretching property of the polyvinyl alcohol-based film may be reduced.

Further, specific examples of the cross-linking agent may include a boron compound such as a boric acid and borax, glyoxal, glutaraldehyde, and the like, and may be used alone or may be used in combination.

Meanwhile, a temperature of the cross-linking bath depends on the amount and a stretching ratio of the cross-linking agent and is not limited thereto, but, generally, it is preferable that the temperature be 45° C. to 60° C. Generally, if the amount of the cross-linking agent is increased, in order to improve mobility of chains of the polyvinyl alcohol-based film, the temperature of the cross-linking bath is adjusted to a high temperature condition, and if the amount of the cross-linking agent is small, the temperature of the cross-linking bath is adjusted to a relatively low temperature condition. However, since the present invention is a process of performing five time or more stretching, in order to improve the stretching property of the polyvinyl alcohol-based film, the temperature of the cross-linking bath should be maintained at 45° C. or more.

Meanwhile, it is preferable that the immersion time of the polyvinyl alcohol-based film in the cross-linking bath be about 30 seconds to 120 seconds. The reason is that in the case where the immersion time is less than 30 seconds, cross-linking may not be uniformly performed on the polyvinyl alcohol-based film, and in the case where the immersion time is more than 120 seconds, cross-linking is saturated, and thus immersion is not needed any longer.

Meanwhile, in the stretching step, stretching refers to uniaxially stretching the film in order to orient polymers of the film in a predetermined direction. A stretching method may be classified into a wet stretching method and a dry stretching method, and the dry stretching method is classified into an inter-roll stretching method, a heating roll stretching method, a compression stretching method, a tenter stretching method, and the like, and the wet stretching method is classified into a tenter stretching method, an inter-roll stretching method, and the like.

In this case, in the stretching step, it is preferable that the polyvinyl alcohol-based film be stretched at a stretching ratio of 4 times to 10 times of the original film and be stretched at a stretching temperature of 45° C. to 60° C. The reason is that the chains of the polyvinyl alcohol-based film should be oriented in order to provide polarization performance to the polyvinyl alcohol-based film, and the chains may not be sufficiently oriented at the stretching ratio of less than 4 times of the original film, and the chains of the polyvinyl alcohol-based film may be cut at the stretching ratio of more than 10 times of the original film. Further, the stretching temperature may depend on the content of the cross-linking agent, because mobility of the chains of the polyvinyl alcohol-based film may be reduced at the temperature of less than 45° C. to reduce stretching efficiency, and in the case where the temperature is more than 60° C., the polyvinyl alcohol-based film may be softened to weaken strength.

Meanwhile, the stretching step and the dyeing step or the cross-linking step may be simultaneously or separately performed. In the case where the stretching step and the dyeing step are simultaneously performed, it is preferable that the dyeing step be performed in the iodine solution, and in the case where the stretching step and the cross-linking step are simultaneously performed, it is preferable that the stretching step be performed in the boric acid aqueous solution.

Next, the present invention includes ② forming the depolarization region having simple substance transmittance of 80% or more in the wavelength band of 400 nm to 800 nm by bringing the decoloring solution including 1 wt % to 30 wt % of the decolorant into local contact with some regions of the polarizer.

First, reviewing each constitutional element in the step of forming the depolarization region, the decoloring solution essentially includes the decolorant and the solvent.

The decolorant is not particularly limited as long as the decolorant can decolor the iodine and/or dichromatic dyes dyed on the polarizer, but, for example, it is preferable that the decolorant include one or more selected from the group consisting of sodium hydroxide (NaOH), sodium hydrosulfide (NaSH), sodium azide ($NaN_3$), potassium hydroxide (KOH), potassium hydrosulfide (KSH), and potassium thiosulfate ($KS_2O_3$).

It is preferable that water (distilled water) be used as the solvent. Further, the solvent may be used while being additionally mixed with an alcohol-based solvent. For example, the solvent may be used while being mixed with methanol, ethanol, butanol, isopropyl alcohol, or the like, but the solvent is not limited thereto.

In this case, the content of the decolorant may depend on a contact time in a decoloring process, but the decoloring solution includes the decolorant in the content of preferably about 1 wt % to 30 wt % and more preferably about 5 wt % to 15 wt %.

In the case where the content of the decolorant is less than 1 wt %, decoloring is not be performed or decoloring is performed for a time of several tens minutes or more, and thus it is difficult to substantially apply the decolorant, and in the case where the content is more than 30 wt %, the decolorant is not easily diffused into the polarizer, and thus it is difficult to perform effective decoloring. Meanwhile, reviewing FIG. 2, it can be confirmed that in the case where the content of the decolorant is less than 1 wt %, the degree of polarization and simple substance transmittance are hardly changed regardless of the contact time.

Further, the pH of the decoloring solution is about 11 to 14 and more preferably about 13 to 14. The decolorant of the present invention is a strong base compound and should have strong basicity enough to break the boric acid forming a cross-linking bond between polyvinyl alcohols, and in the case where the pH is not satisfied, decoloring does not occur. For example, as a solution decomposing (decoloring) iodine to make the polarizer transparent (iodine clock reaction), sodium thiosulfate (pH 7) may cause decoloring in a general iodine compound aqueous solution but does not cause decoloring in an actual polarizer (PVA) even though contact is performed over a long period of time (10 hours). That is, this teaches that the cross-linking bond of the boric acid needs to be broken due to the strong base before iodine is decomposed.

Further, a viscosity of the decoloring solution is about 1 cP to 55 cP, preferably about 5 cP to 20 cP, and more preferably about 10 cP to 15 cP. In the case where the viscosity of the solution is excessively low, in an in-line process, fluidization and diffusion of the decoloring solution occur, and thus it is difficult to form a decolored portion having a desired shape, and in the case where the viscosity is excessively high, in a washing step, washing is not effectively performed.

In the method of manufacturing the polarizer of the present invention, the decoloring solution comes into contact with the polarizer to form the depolarization region, and it is an object of the present invention to form the depolarization region having a desired size at a desired position. Generally, in the case where a depolarization step is performed by using the decoloring solution on the polarizer, since the solution is diffused or flows down, it is difficult to perform depolarization in a desired size and a desired shape at a desired position, and transmittance or the degree of polarization of the region other than the decolored portion is easily affected. However, as described above, in the case where the decoloring solution having the sufficient viscosity is used, the aforementioned problems can be solved, and unnecessary additional diffusion can be reduced to form the fine depolarization region at a desired position.

Meanwhile, it is preferable to use a method of further adding a thickener so that the viscosity of the decoloring solution satisfies the aforementioned range. In this case, the thickener improves the viscosity of the decoloring solution to help to suppress diffusion of the decoloring solution and form the depolarization region having a desired size at a desired position. Moreover, the polarizer is manufactured by a roll to roll process, and in order to precisely form a desired decolored portion in the moving polarizer, diffusion or fluidization of the decoloring solution should not occur. If the solution having the low viscosity is applied on the rapidly moving polarizer, the decoloring solution is diffused into an undesired portion by a difference between relative speeds of a liquid and the polarizer generated during application, and thus practicality is low, and decoloring may occur at an undesired position or may occur in an undesired size by fluidization of the applied solution for a time for which decoloring is performed after application and before washing.

The thickener is not limited as long as the thickener can have low reactivity and increase the viscosity of the solution, but for example, it is more preferable that the thickener include one or more selected from the group consisting of a polyvinyl alcohol-based resin, a polyvinyl acetoacetate-based resin, an acetoacetyl group-denatured polyvinyl alcohol-based resin, butenediolvinyl alcohols, polyacrylamides, and polyethylene glycols. In this case, it is preferable that the viscosity of the thickener be 10 cP to 15 cP.

Meanwhile, the thickener may be included in the content of about 0.5 wt % to 30 wt % and preferably about 2.5 wt % to 15 wt % based on the decoloring solution. In the case where the content of the thickener is more than the aforementioned range, the viscosity is excessively increased, and thus washing is not effectively performed, and in the case where the content of the thickener is excessively low, the viscosity is low, and thus it is difficult to implement a decolored region having a desired shape and a desired size by diffusion and fluidization of the liquid.

To be more specific, it is known that a polyvinyl alcohol complex dyed with the iodine and/or dichromatic dyes can absorb light in the range of visible rays, such as the wavelength band of 400 nm to 800 nm. In this case, if the decoloring solution comes into contact with the polarizer, the iodine or dichromatic dye absorbing light having the visible-ray wavelength band existing in the polarizer is decomposed to decolor the polarizer and thus increase transmittance and reduce the degree of polarization.

For example, in the case where the aqueous solution including potassium hydroxide (KOH), which is the decolorant, comes into contact with some regions of the polyvinyl alcohol-based polarizer dyed with iodine, as indicated by the following Chemical Formulas 1 and 2, iodine is decomposed by a series of processes. Meanwhile, when the polyvinyl alcohol-based polarizer dyed with iodine is manufactured, in the case where a boric acid cross-linking process is performed, as described in Chemical Formula 3, potassium hydroxide directly decomposes the boric acid to remove a cross-linking effect through hydrogen bonding of polyvinyl alcohol and the boric acid.

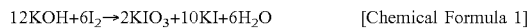

[Chemical Formula 1]

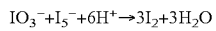

[Chemical Formula 2]

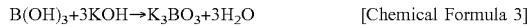

[Chemical Formula 3]

That is, iodine and iodide ion complexes absorbing light in the visible-ray region, such as $I_5^-$ (620 nm), $I_3^-$ (340 nm), and $I_2$ (460 nm), are decomposed to generate $I^-$ (300 nm or less) or a salt thereof and thus allow most of the light in the visible-ray region to penetrate. Accordingly, since a polarization function of the polarizer is solved in the region of about 400 to 800 nm, which is the visible-ray region, transmittance is entirely increased to make the polarizer transparent. In other words, in order to make polarization in the polarizing plate, arranged iodine complexes absorbing the visible rays may be decomposed into a unimolecular form not absorbing the visible rays to solve the polarization function.

To be more specific, reviewing FIG. 1, it can be confirmed that, generally, the polarizer has the degree of polarization (DOP) of 99% or more and simple substance transmittance (Ts) of about 40% in the visible-ray region, but in the case where the depolarization region is formed by the aforementioned manufacturing method, the polarizer has values of the degree of polarization of 10% or less and simple substance transmittance of 80% or more.

Meanwhile, in the present invention, it is preferable that a step of bringing the decoloring solution into contact with the polarizer to ensure depolarization be performed by a non-contact type printing method of applying a decolorant on a desired local portion or applying the decolorant in a pattern having a desired shape by using a dispenser or inkjet, or a contact type printing method such as gravure printing.

It is preferable that the method of manufacturing the polarizer of the present invention further include a washing step using alcohol after the depolarization step. This is because in the depolarization step, in the case where a residual decoloring solution is not appropriately washed, the solution is diffused or remains on the polarizer, and thus the depolarization region may be formed to have an undesired size and an undesired shape and it is difficult to form the depolarization region having a minute size. Particularly, since it is easy to dry alcohol, alcohol can be easily removed, and alcohol does not affect transmittance or the degree of polarization of the polarizer other than the depolarization region, and thus alcohol may be suitably used. For example, it is preferable that alcohol be ethanol, methanol, propanol, butanol, isopropyl alcohol, or a mixture thereof, but alcohol is not limited thereto.

Examples of the washing step include a method of immersing the polarizer in alcohol for 1 second to 180 seconds and more preferably 3 seconds to 30 seconds, or applying the dispenser or inkjet on the local portion decolored by contacting with the decoloring solution at the same position as in the decoloring method.

In the method of manufacturing the polarizer including the depolarization region of the present invention, washing using alcohol is performed after the decolorant is used, and thus, as described above, the iodine compound, the salt, and the like formed by the decolorant are washed out, and the content of iodine and iodide ion complexes of the depolarization region is minimized. Accordingly, absorption of light by residual iodine and iodide ion complexes of the depolarization region is reduced to ensure an effect of making the polarizer more transparent.

Meanwhile, according to the method of manufacturing the polarizer, a contact time of the decoloring solution to the polarizer may depend on a concentration and a temperature of the decoloring solution, and the like. Particularly, it is preferable that a contact time (y) of the decoloring solution satisfy the following Equation 1 with respect to a content (x) of the decolorant.

In this case, the contact time (y) of the decoloring solution means a time required to ensure simple substance transmittance of the depolarization region of 90% or more, and, hereinafter, is represented by 'decoloring completion time'.

$$y=ax^2+bx+c$$ [Equation 1]

x is 1 to 30, a is 0.1 to 0.7, b is −1 to −20, and c is 20 to 120. Preferably, in the case where the decoloring solution is constituted by only the decolorant and the solvent, x is 1 to 30, a is 0.2 to 0.7, b is −9 to −15, and c is 50 to 110. On the other hand, in the case where the solution includes the decolorant, the solvent, and the thickener, x is 1 to 20, a is 0.1 to 0.3, b is −2 to −7, and c is 30 to 70.

In this case, −b/2a is 1 to 20. Particularly, in the case where the decoloring solution is constituted by only the decolorant and the solvent, it is preferable that −b/2a be about 13 to 19. On the other hand, in the case where the solution includes the decolorant, the solvent, and the thickener, it is preferable that −b/2a be about 8 to 12. −b/2a is a numerical value representing the content of the decolorant at a point at which the decoloring time is minimized in the case where a predetermined decoloring solution decolors the polarizer, that is, in the case where the range of −b/2a is 1 to 20, it means that the predetermined decoloring solution satisfies a condition that the content of the decolorant, at which the decoloring time is minimized, is 1 wt % to 20 wt %.

Reviewing the following FIGS. 3 and 4, according to Equation 1, a correlation between the content of the decolorant and the time required to ensure simple substance transmittance of the depolarization region of 90% or more (decoloring completion time) under each temperature condition is illustrated.

To be more specific, it can be seen that in the case where the content of the decolorant, that is, the concentration of the solution, is excessively low or high, the decoloring completion time is rapidly increased, and through the aforementioned drawings, it can be seen that an appropriate content range of the decolorant, at which the decoloring completion time is minimized, exists. That is, in view of the concentration of the decoloring solution, if the content of the decolorant is excessively high, since intermolecular force between the same chemical species is increased to make movement of molecules of the decoloring solution to the polarizer difficult, a negative effect occurs, and thus the decoloring solution having an appropriate concentration is required.

Further, comparing FIGS. 3 and 4 to each other, it can be confirmed that in the case of FIG. 4 where the thickener is added to the solution, as compared to FIG. 3, a width of a secondary graph is narrow, and thus it can be seen that in the case where the thickener is added to increase the viscosity of the solution, diffusion of the decolorant is suppressed to form the depolarization region at a desired position in a relatively low content of the decolorant.

Moreover, a correlation between the concentration of the solution and the decoloring completion time according to the temperature of the decoloring solution can be seen. When the decoloring solution comes into contact with the polarizer, a chemical reaction (breakage of cross-linking of the boric acid and breakage into iodine unimolecules) occurs and is affected by the temperature. In other words, if the temperature is increased, mobility of the molecules is increased, and thus the number of collision between the molecules is increased, and a reaction speed becomes increased. Accordingly, as the temperature is increased, the decoloring completion time is shortened.

Next, the polarizer manufactured by using the method of manufacturing the polarizer of the present invention will be described.

The polarizer according to the present invention is a polyvinyl alcohol-based polarizer dyed with one or more of iodine and dichromatic dyes, locally having a depolarization region having simple substance transmittance of 80% or more in a wavelength band of 400 nm to 800 nm, and a step formed between the depolarization region and a region other than the depolarization region which is 0 μm to 10 μm.

In this case, as described above, simple substance transmittance of the depolarization region is 80% or more and more preferably 90% or 92% or more in the wavelength band of about 400 nm to 800 nm and preferably about 450 nm to 750 nm, which is the visible-ray region. Further, the degree of polarization of the depolarization region is 20% or less and more preferably 5% or less. Further, simple substance transmittance of the region other than the depolarization region of the polarizer is preferably 40% to 45% and more preferably 42% to 45%. Moreover, the degree of polarization of the region other than the depolarization region of the polarizer is preferably 99% or more.

In this case, in the polarizer of the present invention, the step formed between the depolarization region and the region other than the depolarization region is preferably about 0 μm to 10 μm and more preferably about 0 μm to 5 μm.

In the case of an existing physical removal method, a bore is formed in the polarizer, but the polarizer is damaged and torn, and flatness of the polarizer is not uniform and the step is formed by the bore. On the other hand, in the case where the depolarization region is formed by the method of the present invention, since the polarizer does not have a hole or is not damaged, the step of the surface of the polarizer is small.

In this case, the step means a height difference of a boundary portion, at which a camera module or a color formation device is positioned in the polarizer/polarizing plate, between the depolarization region and the region other than the depolarization region, and refers to a difference between the maximum height of the boundary portion and the minimum height of the depolarization region. In this case, the step, as described in the following Experimental Example 3, may be measured by measurement of the boundary portion between the depolarization region and the region other than the depolarization region, and or directly measured by equipment such as an optical profiler (Nanoview E1000, NanoSystem, Co., LTD.) or a three-dimensional microscope (Confocal laser scanning microscopy, CLSM), but in addition to the aforementioned equipment, the equipment is not particularly limited as long as equipment can measure a height. Particularly, the boundary portion between the depolarization region and the region other than the depolarization region may exist at a distance of more than 0 cm and 3 cm or less from the center of the depolarization region, but is not limited thereto.

Meanwhile, in the depolarization region, the content of one or more of the iodine and dichromatic dyes is about 0.1 wt % to 0.5 wt % and preferably about 0.1 wt % to 0.35 wt %. This is because, as described above, iodine existing in a complex form on the polarizer is washed out by a reaction between the decolorant and iodine, and thus the content of the iodine and/or dichromatic dyes is significantly reduced. In comparison with this, in the region other than the depolarization region, the content of one or more of the iodine and dichromatic dyes is about 1 wt % to 4 wt % and preferably about 2 wt % to 4 wt %.

In this case, the content of the iodine and/or dichromatic dyes was measured by using an optical X-ray analytical instrument (manufactured by Rigaku Electric Co., Ltd., trade name "ZSX Primus II"). In the present invention, average wt % per the volume of 19.2 mm$^3$ was measured by using a polarizer sheet-type sample having a size of 40 mm×40 mm and a thickness of 12 μm.

The depolarization region, as will be described below, is formed through a step of bringing the polarizer into contact with the decoloring solution. In this case, the content of the iodine and/or dichromatic dyes of the depolarization region is significantly reduced as compared to the other region, and thus transmittance is largely improved.

Meanwhile, it is preferable that an area of the depolarization region occupy 0.005% to 40% of the entire polarizing plate according to a kind of displays and the use purpose of the depolarization region, but the depolarization region is not limited thereto.

Further, the shape, the position, or the like of the depolarization region is not particularly limited, and the depolarization region may be formed at various positions in various shapes. For example, the depolarization region may be formed at a position at which parts such as a camera are equipped so as to correspond to a shape of the parts, may be formed in a region in which a product logo is printed in a shape of the product logo, or in the case where a color is provided to an edge portion of a polarizing member, the depolarization region may be formed at the edge portion of the polarizing member to have a frame shape.

Meanwhile, the present invention provides a polarizing plate in which a polarizer protection film is laminated on one surface or both surfaces of the polarizer including the depolarization region.

In the case of the polarizing plate of the present invention, depolarization is performed in only some regions of the polarizer, and thus the polarizing plate has the depolarization region having high simple substance transmittance and the low degree of polarization without causing physical damage to the polarizing plate unlike an existing physical polarization removal method such as punching and cutting.

The protection film refers to a transparent film attached to both laterals surfaces of the polarizer in order to protect the polarizer, and acetate-based such as triacetyl cellulose (TAC), acryl-based, polyester-based, polyethersulfone-based, polycarbonate-based, polyamide-based, polyimide-based, and polyolefin-based resin films, and the like may be used, but the protection film is not limited thereto.

In this case, the protection film may be laminated by using an adhesive, and as the adhesive, a polyvinyl alcohol-based aqueous adhesive may be used, but the adhesive is not limited thereto. Further, in the polarizing plate, in addition to the protection film, in order to improve an additional function, a functional film such as a wide viewing angle compensation plate or a luminance improvement film may be further included.

Meanwhile, the polarizing plate including the polarizer of the present invention as described above may be attached to one surface or both surfaces of a display panel to be usefully applied to an image display device. The display panel may be a liquid crystal panel, a plasma panel, and an organic light emitting panel, accordingly, the image display device may be a liquid crystal display (LCD), a plasma display panel (PDP), and an organic light emitting diode (OLED).

To be more specific, the image display device may be a liquid crystal display including a liquid crystal panel and polarizing plates provided on both surface of the liquid crystal panel, and in this case, at least one of the polarizing plates may be the polarizing plate including the polarizer according to the present invention. That is, the polarizing plate includes the polyvinyl alcohol-based polarizer dyed with one or more of the iodine and dichromatic dyes, and locally has the depolarization region having simple substance transmittance of 80% or more.

In this case, a kind of liquid crystal panel included in the liquid crystal display is not particularly limited. For example, all publicly known panels such as a passive matrix-type panel such as a TN (twisted nematic) type, a STN (super twisted nematic) type, a F (ferroelectric) type, or a PD (polymer dispersed) type; an active matrix-type panel such as a two terminal type or a three terminal type; an in plane switching (IPS) panel, and a vertical alignment (VA) panel may be applied, but the kind is not limited thereto. Further, a kind of other constitutions constituting the liquid crystal display, for example, upper and lower substrates (for example, a color filter substrate or an array substrate) and the like, is not particularly limited, and a constitution publicly known in the art may be adopted without a limitation.

Meanwhile, the image display device of the present invention includes other parts such as a camera module, but is not limited thereto, and the other parts such as the camera module may be positioned in the depolarization region. The camera module may be positioned in the depolarization region where transmittance of the visible-ray region is improved and it is depolarized to achieve an effect of increasing visibility of a camera lens portion.

Hereinafter, the present invention will be described in more detail through the Examples. The following Examples are set forth to illustrate the present invention, but are not to be construed to limit the present invention.

Preparation Example—Manufacturing of Polarizer

The polyvinyl alcohol-based film (Nippon Gohsei Co., Ltd. M3000 grade 30 μm) was subjected to the swelling process in the pure solution at 25° C. for 15 seconds, and then subjected to the dyeing process in the iodine solution having the concentration of 0.2 wt % at 25° C. for 60 seconds. Thereafter, the polyvinyl alcohol-based film was subjected to the washing process in 1 wt % of boric acid solution at 45° C. for 30 seconds, and the six times stretching process was then performed in 2.5 wt % of boric acid solution at 52° C. After stretching, the polyvinyl alcohol-based film was subjected to the complementary color process in 5 wt % of KI solution, and then dried in the oven at 60° C. for 5 minutes to manufacture the polarizer having the thickness of 12 μm.

Examples 1 to 7

The decoloring solution was prepared by using the decolorant, the solvent, and the thickener in kinds and contents described in the following [Table 1]. Next, the decoloring solution was applied by using the dispenser in the region of 3 $cm^2$ of the polarizer manufactured by the aforementioned Preparation Example. Thereafter, after 35 seconds, immersion was performed for 3 seconds by using ethanol, and ethanol was dried in the oven at 60° C. for 30 seconds to manufacture the polarizer including the depolarization region.

Comparative Examples 1 to 3

The decoloring solution was prepared by using the decolorant, the solvent, and the thickener in kinds and contents described in the following [Table 1], and the polarizer was manufactured by the same method as Example 1.

Comparative Example 4

The polarizer manufactured by the aforementioned Preparation Example was cut to have the size of 60 mm×60 mm, and then exposed to light at the wavelength of 266 nm in the intensity of 0.6 $W/cm^2$ for 10 minutes by using the laser (Verdi V2, MBD resonator, Coherent, Inc.) to manufacture the polarizer where the depolarization region was formed.

Comparative Example 5

After the polarizer manufactured by the aforementioned Preparation Example was cut to have the size of 60 mm×60 mm, the region of 3 $cm^2$ of the polarizer was removed by using the punching machine for cutting the polarizing plate.

Experimental Example 1—Evaluation of Optical Properties of Depolarization Region The polarizers manufactured by the aforementioned Examples and Comparative Examples were cut to have the size of 40 mm×40 mm, the specimen was fixed to the measurement holder, and initial optical properties, that is, simple substance transmittance and the degree of polarization of the depolarization region were measured by using the UV-VIS spectrometer (V-7100, manufactured by JASCO Corp.). Particularly, the values at 550 nm are described in Table 1.

Experimental Example 2—Evaluation of Content of Iodine of Depolarization Region

In the polarizer, the content of the iodine and/or dichromatic dyes of the depolarization region was measured by using the optical X-ray analytical instrument (manufactured by Rigaku Electric Co., Ltd., trade name "ZSX Primus II"). In this case, after the four polarizer sheet-type samples manufactured by the aforementioned Examples and Comparative Examples and having the thickness of 12 μm were stacked to be placed in the 20 mm holder, the iodine KA fluorescent intensity was measured. The average of wt % per the volume of 19.2 mm$^3$ obtained by performing measurement three times in total is described in the following [Table 1].

Experimental Example 3—Evaluation of Step of Surface of Polarizer

In the polarizers manufactured by Examples 1 to 7 and Comparative Examples 1 to 5, the step formed between the depolarization region and the region other than the depolarization region was measured by using the 5× lens of the optical profiler (Nanoview E1000, NanoSystem, Co., LTD.).

Reviewing the Examples and Comparative Examples 1 to 3 of Table 1, it can be confirmed that in the case where the content of the decolorant satisfies the content range of the present invention, decoloring is performed, and the iodine content of the depolarization region is 0.3 wt % or less.

Further, comparing to Comparative Example 4, it can be confirmed that as compared to the case where ultraviolet rays are exposed to form the depolarization region, transmittance is higher and the degree of polarization is lower. Moreover, comparing to Comparative Example 5, it can be confirmed that the step formed between the depolarization region and the region other than the depolarization region is significantly small and has an excellent surface appearance as compared to the step formed by a method through physical punching.

Although the exemplary embodiments of the present application are described in detail with reference to the accompanying drawings, the scope of the present invention is not limited to the exemplary embodiments, and it will be apparent to those skilled in the art that various modifications and changes may be made thereto without departing from the spirit of the present invention described in the claims.

The invention claimed is:

1. A method of manufacturing a polarizer, comprising:
preparing a polyvinyl alcohol-based polarizer dyed with one or more of iodine and dichromatic dyes; and
forming a depolarization region having simple substance transmittance of 90% or more in a wavelength band of 400 nm to 800 nm by bringing a decoloring solution into local contact with some regions of the polarizer,

TABLE 1

| Classification | Solution composition (wt %) | | | Temperature (° C.) | Decoloring completion time (s) | pH | Physical properties of depolarization region | | | | |
|---|---|---|---|---|---|---|---|---|---|---|---|
| | Decolorant | Solvent | Thickener | | | | Iodine content of depolarization region (wt %) | Viscosity (cP) | Simple substance transmittance (%) | Degree of polarization (%) | Step of depolarization region (μm) |
| Example 1 | KOH 5 | Water | — | 25 | 45 | 14 | 0.3 | 1 | 92 | 0.8 | 2.80 |
| Example 2 | KOH 5 | Water | — | 25 | 36 | 14 | 0.3 | 1 | 92 | 0.8 | 2.63 |
| Example 3 | KOH 10 | Water | — | 60 | 16 | 14 | 0.3 | 1 | 92 | 0.8 | 2.78 |
| Example 4 | NaOH 5 | Water | — | 25 | 40 | 14 | 0.3 | 1 | 92 | 0.8 | 2.79 |
| Example 5 | NaOH 10 | Water | — | 25 | 32 | 14 | 0.3 | 1 | 92 | 0.8 | 2.87 |
| Example 6 | KOH 10 | Water | Polyacrylamide-based resin (15 wt %) | 25 | 27 | 14 | 0.3 | 7.8 | 92 | 0.8 | 2.81 |
| Example 7 | KOH 10 | Water | Butenediol vinylalcohol-based resin (4 wt %) | 25 | 26 | 14 | 0.3 | 26 | 92 | 0.8 | 2.69 |
| Comparative Example 1 | KOH 0.1 | Water | — | 25 | No decoloring | 12.8 | 3 | 1 | 42.5 | 99.99 | 1.10 |
| Comparative Example 2 | KOH 50 | Water | — | 25 | No decoloring | 14 | 3 | 1 | 42.5 | 99.99 | 0.99 |
| Comparative Example 3 | KOH 50 | Water | Butenediol vinylalcohol-based resin (4 wt %) | 25 | No decoloring | 14 | 3 | 26 | 42.5 | 99.99 | 1.01 |
| Comparative Example 4 | 266 nm laser radiation | | | Use of power of 0.6 W/cm$^2$ Radiation for 10 to 20 minutes | | | 3 | | 86.2 | 8.1 | 0 |
| Comparative Example 5 | Punching cutting | | | Region of 3 cm$^2$ is removed by using punching machine for cutting polarizing plate | | | — | — | — | — | 12.77 | wherein the forming of the depolarization region by bringing the decoloring solution into contact with some regions of the polarizer is performed by a dispenser, inkjet, or gravure printing method, wherein a pH of the decoloring solution is 11 to 14, wherein the decoloring solution further includes a thickener, which includes one or more selected from the group consisting of a polyvinyl alcohol-based resin, a polyvinyl acetoacetate-based resin, an acetoacetyl group-denatured polyvinyl alcohol-based resin, butenediolvinyl alcohols, a polyethylene glycol-based resin, and a polyacrylamide-based resin, wherein a viscosity of the decoloring solution is 5 cP to 55 cP, wherein the decoloring solution includes 5 wt % to 15 wt % of a decolorant; 2.5 wt % to 15 wt % of a thickener; and water as a balance, based on an entire solution, wherein a decoloring completion time is 46 seconds or less, and wherein the decoloring completion time means a time required to ensure simple substance transmittance of the depolarization region of 90% or more.

2. The method of claim 1, wherein the decolorant includes one or more selected from the group consisting of sodium hydroxide (NaOH), sodium hydrosulfide (NaSH), sodium azide ($NaN_3$), potassium hydroxide (KOH), potassium hydrosulfide (KSH), and potassium thiosulfate ($KS_2O_3$).

3. The method of claim 1, further comprising:
washing using alcohol after the forming of the depolarization region.

4. A polyvinyl alcohol-based polarizer dyed with one or more of iodine and dichromatic dyes, locally having a depolarization region having simple substance transmittance of 90% or more in a wavelength band of 400 nm to 800 nm, and a step formed between the depolarization region and a region other than the depolarization region which is 0 μm to 10 μm, wherein the step is a height difference of a boundary portion, at which a camera module is positioned, between the depolarization region and the region other than the depolarization region, and is a difference between the maximum height of the boundary portion and the minimum height of the depolarization region, wherein the depolarization region has a shape corresponding to the camera module; and wherein in the depolarization region, a content of one or more of the iodine and dichromatic dyes is 0.1 wt % to 0.5 wt %, and in the region other than the depolarization region, the content of one or more of the iodine and dichromatic dyes is 1 wt % to 4 wt %.

5. The polarizer of claim 4, wherein in the depolarization region of the polarizer, a degree of polarization is 20% or less.

6. The polarizer of claim 4, wherein the simple substance transmittance of the region other than the depolarization region of the polarizer is 40% to 45%.

7. The polarizer of claim 4, wherein in the region other than the depolarization region of the polarizer, a degree of polarization is 99% or more.

8. The polarizer of claim 4, wherein an area of the depolarization region occupies 0.005% to 40% of an entire polarizing plate.

9. A polarizing plate manufactured by laminating a polarizer protection film on at least one surface of the polarizer according to claim 4.

* * * * *